United States Patent
Goldstein et al.

(10) Patent No.: US 6,771,830 B2
(45) Date of Patent: *Aug. 3, 2004

(54) DIFFERENTIAL PULSE CODE MODULATION IMAGE COMPRESSION WITH VARYING LEVELS OF QUANTIZERS

(75) Inventors: Judith A. Goldstein, Hillsboro, OR (US); Lawrence K. Freytag, Olympia, WA (US); Michael Keith, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 327 days.

This patent is subject to a terminal disclaimer.

(21) Appl. No.: 09/904,829

(22) Filed: Jul. 12, 2001

(65) Prior Publication Data

US 2001/0041016 A1 Nov. 15, 2001

Related U.S. Application Data

(63) Continuation of application No. 08/939,321, filed on Sep. 29, 1997, now Pat. No. 6,295,379.

(51) Int. Cl.[7] ............................. G06K 9/36; G06K 9/38; G06K 9/46
(52) U.S. Cl. ....................... 382/251; 382/233; 382/239; 382/238
(58) Field of Search ................................ 382/239, 238, 382/251, 236; 375/240.02, 240.03, 240.12, 240.14, 240.25; 341/51, 106

(56) References Cited

U.S. PATENT DOCUMENTS

| | | | | |
|---|---|---|---|---|
| 4,540,973 A | * | 9/1985 | Grallert | ........................ 341/76 |
| 4,725,885 A | * | 2/1988 | Gonzales et al. | ...... 375/240.14 |
| 4,953,214 A | * | 8/1990 | Takeguchi et al. | .......... 704/230 |
| 5,225,904 A | | 7/1993 | Golin et al. | ................. 358/133 |
| 5,424,779 A | | 6/1995 | Odaka et al. | ................ 348/416 |
| 5,509,089 A | * | 4/1996 | Ghoshal | ..................... 382/236 |
| 5,812,790 A | | 9/1998 | Randall | ................. 395/200.77 |
| 5,835,149 A | | 11/1998 | Astle | ........................... 348/419 |
| 5,850,484 A | | 12/1998 | Beretta et al. | ............... 382/250 |
| 6,026,197 A | | 2/2000 | Ohsawa et al. | .............. 382/240 |
| 6,295,379 B1 | * | 9/2001 | Goldstein et al. | ........... 382/239 |

\* cited by examiner

Primary Examiner—Timothy M. Johnson
(74) Attorney, Agent, or Firm—Blakely, Sokoloff, Taylor & Zafman LLP

(57) ABSTRACT

A method and apparatus for encoding a digital image is disclosed. A difference is calculated between a first sample from a current scan line and a corresponding second sample from a previous scan line. A quantization table level is selected from a quantization table that includes at least one level, and information identifying the selected level is placed into an information stream. A quantizer is selected from the quantization table level based on the calculated difference and information corresponding to the selected quantizer is place into the information stream.

8 Claims, 8 Drawing Sheets

300

| SAMPLE | 0 | 1 | 2 | 3 | 4 | 5 | 6 | 7 |
|---|---|---|---|---|---|---|---|---|
| | | | EXAMPLE Y-PLANE | | | | | |
| LINE 0 (PREVIOUS LINE) | 157 | 158 | 153 | 152 | 159 | 162 | 108 | 107 |
| LINE 1 (CURRENT LINE) | 156 | 158 | 157 | 159 | 40 | 60 | 111 | 116 |

*FIG. 3*

400 ⟶ EXAMPLE QUANTIZER TABLE

QUANTIZERS

| | | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|
| LEVEL | 0 | 0 | 1 | -1 | 2 | -2 | 3 | -3 | 4 | -4 | 5 | -5 | 6 | -6 | 7 | -7 |
| | 1 | 0 | 4 | -4 | 9 | -9 | 16 | -126 | 25 | -25 | 36 | -36 | 49 | -49 | 64 | -64 |
| | 2 | 0 | 5 | -5 | 15 | -15 | 32 | -32 | 55 | -55 | 88 | -88 | 129 | -129 | 181 | -181 |
| | 3 | 0 | 8 | -8 | 27 | -27 | 64 | -64 | | | | | | | | |
| | 4 | 0 | 11 | -11 | 46 | -46 | 128 | -128 | | | | | | | | |

HIGH QUALITY, 4-BIT ENCODING EXAMPLE

| SAMPLE | DIFFERENCE | BEST LEVEL | LEVEL USED | QUANTIZER | QUANTIZATION VALUE | INFORMATION STREAM |
|---|---|---|---|---|---|---|
| 0 | -1 | 1 | 1 | 0 | 0 | 0 |
| 1 | 0 | 1 | 1 | 0 | 0 | 0 |
| 2 | 4 | 1 | 1 | 1 | 4 | 1 |
| 3 | 7 | 1 | 1 | 3 | 9 | 3 |
| 4 | -119 | 2 | 2 | 12 | -129 | 15, 2 LEVEL SHIFT 12 |
| 5 | -102 | 2 | 2 | 10 | -88 | 10 |
| 6 | 3 | 1 | 2 | 1 | 5 | 1 |
| 7 | 9 | 1 | 2 | 1 | 5 | 1 |

| SAMPLE | 0 | 1 | 2 | 3 | 4 | 5 | 6 | 7 |
|---|---|---|---|---|---|---|---|---|
| LINE 0 (PREVIOUS LINE) | 157 | 158 | 153 | 152 | 159 | 162 | 108 | 107 |
| LINE 1 (CURRENT LINE) | 157 | 158 | 157 | 161 | 30 | 74 | 113 | 111 |

HIGH QUALITY, 3-BIT ENCODING EXAMPLE

| SAMPLE | DIFFERENCE | BEST LEVEL | LEVEL USED | QUANTIZER | QUANTIZATION VALUE | INFORMATION STREAM |
|---|---|---|---|---|---|---|
| 0 | -1 | 2 | 2 | 0 | 0 | 0 |
| 1 | 0 | 2 | 2 | 0 | 0 | 0 |
| 2 | 4 | 2 | 2 | 1 | 5 | 1 |
| 3 | 7 | 2 | 2 | 1 | 5 | 1 |
| 4 | -119 | 4 | 4 | 6 | -128 | 7, 4 LEVEL SHIFT 6 |
| 5 | -102 | 4 | 4 | 6 | -128 | 6 |
| 6 | 3 | 2 | 4 | 0 | 0 | 0 |
| 7 | 9 | 2 | 4 | 1 | 11 | 1 |

| SAMPLE | 0 | 1 | 2 | 3 | 4 | 5 | 6 | 7 |
|---|---|---|---|---|---|---|---|---|
| LINE 0 (PREVIOUS LINE) | 157 | 158 | 153 | 152 | 159 | 162 | 108 | 107 |
| LINE 1 (CURRENT LINE) | 157 | 158 | 158 | 157 | 31 | 34 | 108 | 118 |

4-BIT ENCODE TABLE (NO UNDER CORRECTION)

| | \ QUANTIZER (LIMIT) | | | | | | | |
|---|---|---|---|---|---|---|---|---|
| | | 0 | 1, 2 | 3, 4 | 5, 6 | 7, 8 | 9, 10 | 11, 12 | 13, 14 (LAST) |
| LEVEL | 0 | 1 | 2 | 3 | 4 | 5 | 6 | 7 | 8 |
| | 1 | 3 | 7 | 13 | 21 | 31 | 43 | 57 | Y 65 / $C_R, C_B$ MAX |
| | 2 | 3 | 11 | 24 | 44 | 72 | 109 | 156 | Y MAX |
| | 3 | N/A | N/A | N/A | N/A | N/A | N/A | N/A | N/A |
| | 4 | N/A | N/A | N/A | N/A | N/A | N/A | N/A | N/A |

FIG. 8B

4-BIT ENCODE TABLE (50% UNDER CORRECTION)

| | \ QUANTIZER (LIMIT) | | | | | | | |
|---|---|---|---|---|---|---|---|---|
| | | 0 | 1, 2 | 3, 4 | 5, 6 | 7, 8 | 9, 10 | 11, 12 | 13, 14 (LAST) |
| LEVEL | 0 | 2 | 4 | 6 | 8 | 10 | 12 | 14 | 15 |
| | 1 | 6 | 14 | 26 | 42 | 62 | 86 | 114 | Y 129 / $C_R, C_B$ MAX |
| | 2 | 6 | 22 | 48 | 88 | 144 | 218 | 312 | Y MAX |
| | 3 | N/A | N/A | N/A | N/A | N/A | N/A | N/A | N/A |
| | 4 | N/A | N/A | N/A | N/A | N/A | N/A | N/A | N/A |

FIG. 8C

4-BIT DECODE TABLE

| | \ QUANTIZER | | | | | | |
|---|---|---|---|---|---|---|---|
| | | 1, 2 | 3, 4 | 5, 6 | 7, 8 | 9, 10 | 11, 12 | 13, 14 |
| LEVEL | 0 | 1 | 2 | 3 | 4 | 5 | 6 | 7 |
| | 1 | 4 | 9 | 16 | 25 | 36 | 49 | 64 |
| | 2 | 5 | 15 | 32 | 55 | 88 | 129 | 181 |
| | 3 | N/A | N/A | N/A | N/A | N/A | N/A | N/A |
| | 4 | N/A | N/A | N/A | N/A | N/A | N/A | N/A |

# DIFFERENTIAL PULSE CODE MODULATION IMAGE COMPRESSION WITH VARYING LEVELS OF QUANTIZERS

This is a continuation of Application Ser. No. 08/939,321, filed on Sep. 29, 1997 now U.S. Pat. No. 6,295,379.

BACKGROUND OF THE INVENTION

1. Field of the Invention

The present invention pertains to the field of digital image compression. More particularly, this invention pertains to algorithms for near-lossless digital video compression.

2. Background of the Related Art

A video signal comprises a sequence of frames or images which when displayed at a given frame rate (e.g., 15 to 30 frames per second) simulates the appearance of motion to a human observer. Each frame of the video image comprises a matrix of picture elements, known as "pixels" or "pels." A pixel is the minimum unit of the picture which may be assigned a luminance intensity and a color. In a computer, depending on the data format used, as many as 3 bytes of data can be used to define visual information for a pixel. One popular data format assigns a luminance intensity represented by 1 byte of data to each pixel and further assigns a color represented by 2 bytes of data to groups of 4 pixels each. This format results in an average use of 12 data bits to represent each pixel. Therefore, a single frame at a resolution of 320×240 can be represented by about 120,000 bytes of data.

Digital video cameras must transfer frame data to a video memory system for display. Multiple frames are transferred over a period of time. The number of frames transferred and displayed per second is referred to as the frame rate. In general, greater frame rates contribute to heightened appearances of motion, while lower frame rates contribute to the observer being able to perceive individual frames, thus destroying the appearance of motion. A frame rate of 15 frames per second (fps) with a resolution of 320×240 and each pixel being represented by an average of 12 bits requires that about 14 Mbits of data must be transferred between the digital video camera and the video memory each second.

Digital video cameras are typically connected to a computer system via a peripheral bus. One peripheral bus that is gaining wide acceptance in the computer industry is the Universal Serial Bus (USB). The USB data transfer rate of 8 Mbits/second supports a wide variety of desktop peripherals, from modems, printers, microphones and speakers to graphics tablets, game controls, joysticks, scanners, and digital cameras. However, the USB data rate of 8 Mbits/second is insufficient to support a frame rate of 15 fps for 320×240 video. Further, since several devices may reside on the USB, it is desirable that a digital camera not use the entire 8 Mbits/second.

Data compression allows an image or video segment to be transferred and stored in substantially fewer bytes of data than required for uncompressed frames. Many methods of digital video compression are based on the idea of eliminating redundant information from frame to frame in a digitized video segment. This is referred to as "interframe compression." Interframe compression methods exploit the temporal redundancy that exists between digital video frames from the same scene recorded moments apart in time. This reduces the required data needed to encode each frame.

Interframe compression is not ideally suited to the USB environment. This is due to the fact that the USB architecture will not guarantee that every frame of digital video data will be transferred. It is possible that some frames may be dropped. Since interframe compression techniques depend on frame-by-frame redundancies, dropped frames can have a significant impact on picture quality. Therefore, it is desirable to provide a method and apparatus for compressing digital video images that will allow digital cameras to operate on peripheral busses such as the USB.

Further, it is desirable to provide a method and apparatus for compressing digital video images that is not perceived as "lossy" by the human visual system. Video compression techniques that humans perceive as "lossy" do not fully preserve all the information originally captured in an image. In general, for "lossy" techniques, as the compression of the video data is increased, the quality of the video suffers.

SUMMARY OF THE INVENTION

A method and apparatus for encoding a digital image is disclosed. A difference is calculated between a first sample and a second sample. A quantization table level is selected from a quantization table the includes at least one level, and information identifying the selected level is placed into an information stream. A quantizer is selected from the quantization table level based on the calculated difference and information corresponding to the selected quantizer is placed into the information stream.

BRIEF DESCRIPTION OF THE DRAWINGS

FIG. 3 shows data representing two scan lines from an example Y-plane of a frame of digital video.

FIG. 4 depicts an example quantization table implemented in accordance with one embodiment of the invention.

FIG. 5a illustrates a high quality, 4-bit encoding example implemented in accordance with one embodiment of the invention.

FIG. 5b depicts an example decoding result from the high quality, 4-bit encoding example illustrated in FIG. 5a implemented in accordance with one embodiment of the invention.

FIG. 6a illustrates a high compression, 3-bit encoding example implemented in accordance with one embodiment of the invention.

FIG. 6b depicts an example decoding result from the high compression, 3-bit encoding example illustrated in FIG. 6a implemented in accordance with one embodiment of the invention.

FIG. 8a depicts an example 4-bit encode table with no under-correction implemented in accordance with one embodiment of the invention.

FIG. 8b depicted an example 4-bit encode table with 50% under-correction implemented in accordance with one embodiment of the invention.

FIG. 8c depicts an example 4-bit encode table implemented in accordance with one embodiment of the invention.

DETAILED DESCRIPTION

A method and apparatus for near-lossless digital video compression is disclosed. In the following description, for the purposes of explanation, specific details are set forth to provide a thorough understanding of the invention. However, it will be obvious to one skilled in the art that these specific details are not required to practice the invention. In other instances, well known methods, devices, and structures are not described in particular detail in order to avoid obscuring the invention.

Overview

The invention solves the problem of providing digital image compression that results in an ordinary viewer of the resulting image perceiving the image as "non-lossy" and further that does not rely on interframe redundancies, thereby allowing high quality digital video signals to be transferred across a peripheral bus such as the USB. The invention accomplishes this by using a compression method that takes advantage of redundancies between two scan lines within a given frame of digital video. The compression algorithm of the invention uses Differential Pulse Code Modulation (DPCM) with varying levels or tables of quantizers. In general, and in accordance with one embodiment of the invention, a difference is calculated between a first sample from a current scan line and a corresponding second sample from a previous scan line. A quantization table level is selected from a quantization table that includes at least one level, and information identifying the selected level is placed into an information stream. A quantizer is selected from the quantization table level based on the calculated difference and information corresponding to the selected quantizer is placed into the information stream.

The invention provides "near-lossless" digital image compression. The term "near-lossless" as used herein means that while some information corresponding to an image is not preserved during the compression process, an ordinary viewer of the resulting decoded and displayed image would not notice any degradation in quality.

One Embodiment of the Invention

For this embodiment, each picture element has a luminance intensity component (the Y component) and two color components (the $C_R$ and $C_B$ components). The totality of Y components for a given frame is referred to as the Y plane for that frame. Likewise, the totality of the $C_R$ and $C_B$ components for a given frame can be referred to as $C_R$ and $C_B$ planes, respectively. These luminance and color components conform to the International Telecommunications Union—Radio Sector (ITU-R) BT.601 standard. Other video color systems, such as RGB, may also be used with the invention.

Figure 1:
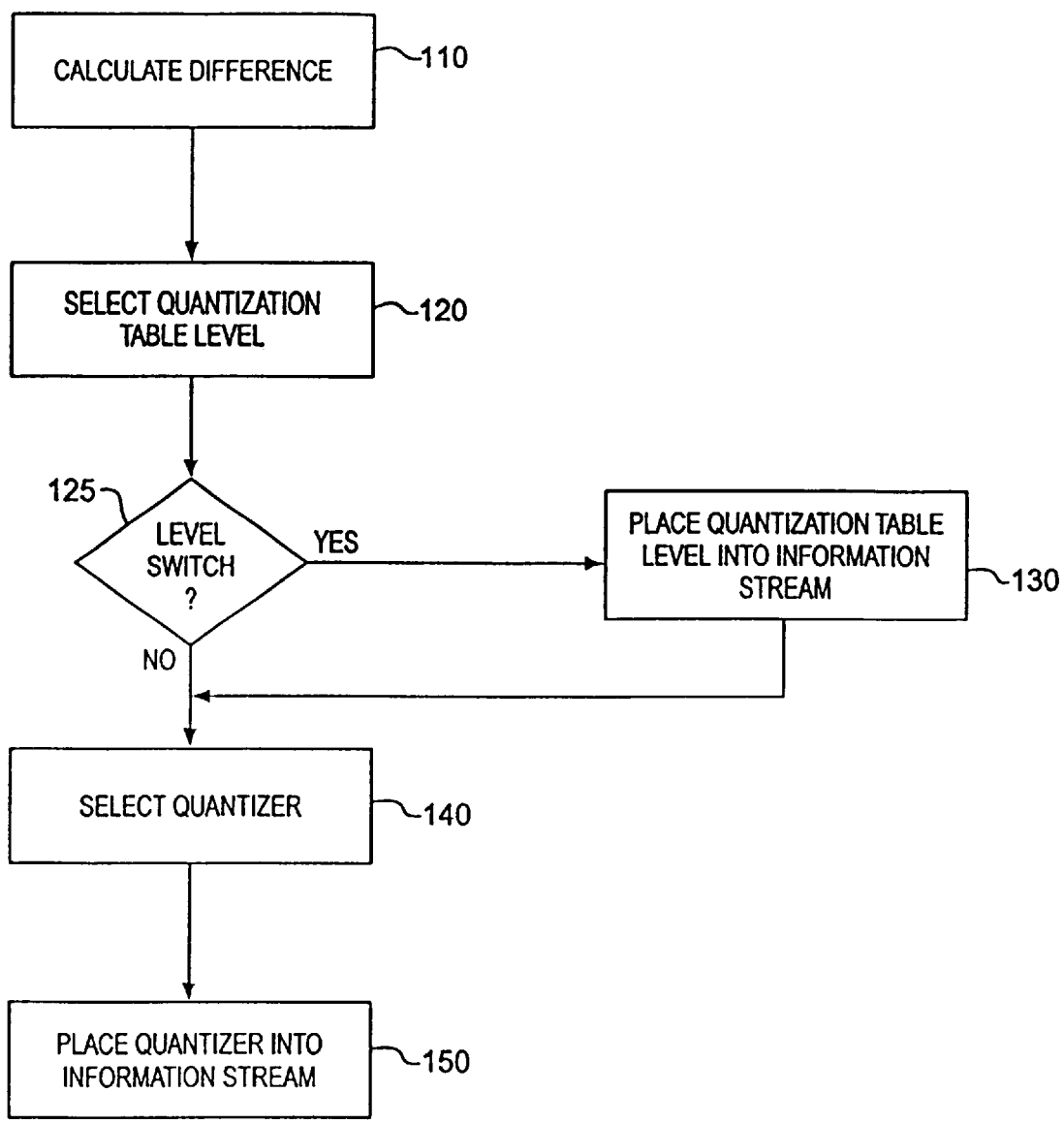
FIG. 1 shows a flow chart of a method for encoding data representing a component of a picture element implemented in accordance with one embodiment of the invention.

FIG. 1 shows a flow chart of a method for encoding data representing a component of a picture element implemented in accordance with one embodiment of the invention. At step 110, a difference is calculated between a sample value for a picture element from a current scan line and a sample value for a picture element from a previous scan line.

Following step 110, a quantization table level is selected at step 120. The quantization table may include any number of levels, with each level including any number of quantizers. An example quantization table is shown in FIG. 4, discussed below. The level selection is based on the value of the calculated difference.

If the selected level differs from a previously selected level, a level switch occurs. This determination is made at step 125. The term "level switch" is more fully discussed below in connection with FIG. 2. If there is a level switch, information identifying the selected level is placed into an information stream at step 130. The information stream may be a bit-stream that is transferred across a peripheral bus such as the USB. The information stream may also include information being transferred across buses with data path widths greater than 1 bit. The information stream is received by a device or system that will perform decoding functions.

After the information identifying the selected level is placed in the information stream, a quantizer from the selected level is selected at step 140. The term quantizer as used herein is defined as an index into the quantization table. The quantizer selection is based on the value of the calculated difference. Following quantizer selection, information identifying the selected quantizer is placed in the information stream at step 150.

Figure 2:
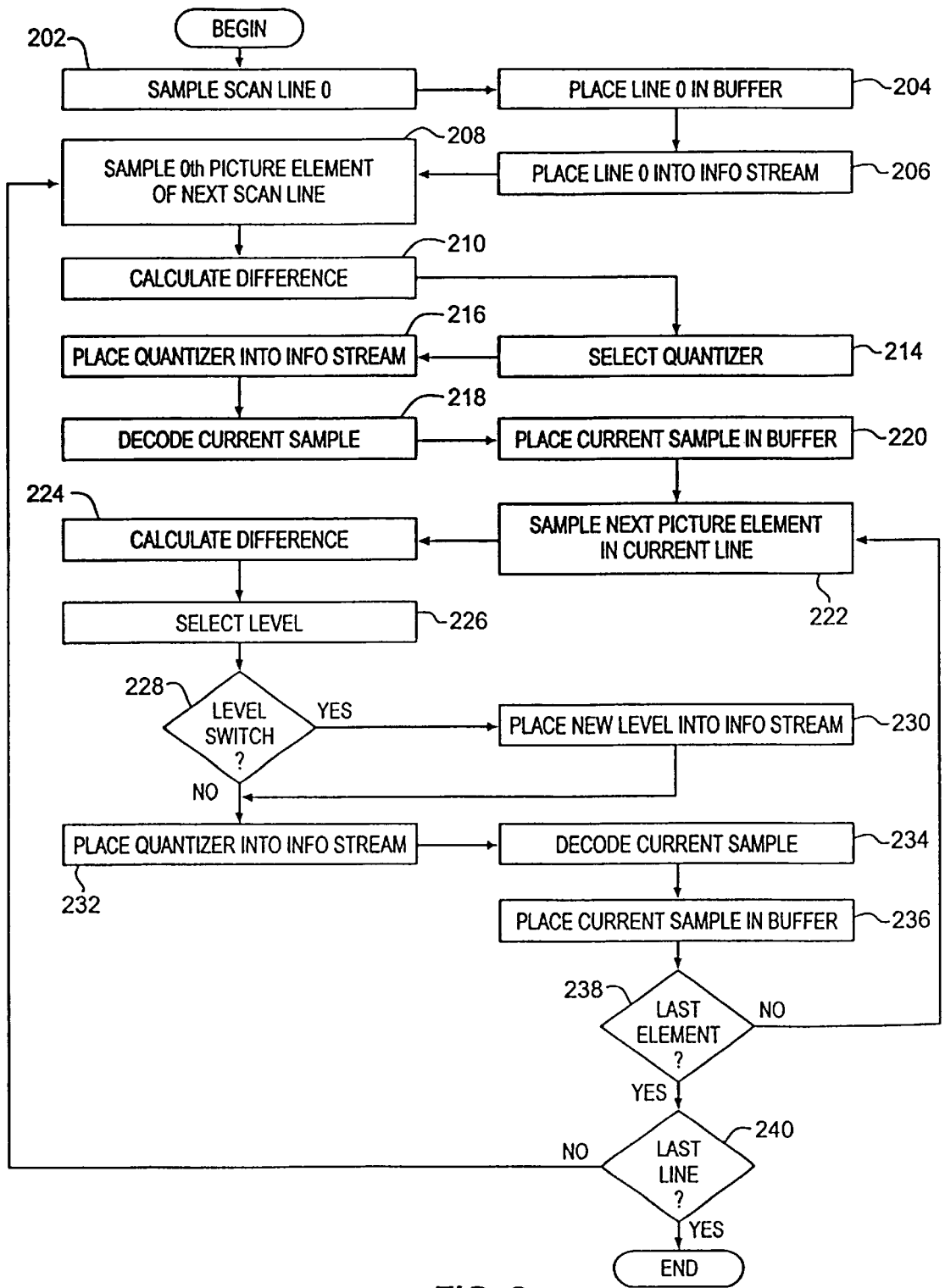
FIG. 2 depicts a flow chart of a method for encoding data representing a component of each picture element of a digital image implemented in accordance with one embodiment of the invention.

FIG. 2 depicts a flow chart of a method for encoding data representing a component of each picture element of a digital image implemented in accordance with one embodiment of the invention. For this embodiment, each plane is processed independently, although other embodiments are possible where the planes are not processed independently. The method depicted in FIG. 2 begins with step 202 where the $0^{th}$ scan line is sampled. The sample values for scan line 0 are stored in a buffer or some other storage device at step 204. Next, the sample values are placed in an information stream at step 206. Note that the $0^{th}$ scan line of each plane is not quantized or encoded at all. The $0^{th}$ line serves as a predictor for the following scan line, as discussed below.

Following step 206 is step 208 where the $0^{th}$ picture element of the next scan line (line 1) is sampled. After sampling the $0^{th}$ picture element of scan line 1, a difference is calculated at step 210 between the sample value of the $0^{th}$ picture element of line 1 and the sample value of the $0^{th}$ picture element from the $0^{th}$ scan line.

The present embodiment uses a quantization table that has multiple levels. For example, one level may have quantizers ranging in value from 0 to +/−7 while another level may have quantizers ranging in value from 0 to +/−181, as shown in the example quantization table of FIG. 4 which is discussed below. For the present embodiment, a default level, known to both the encoder and decoder, is used at the beginning of each scan line that is encoded. Since the default level is known to both the encoder and the decoder, there is no need to communicate the selection of the default level to the decoder. The invention may also be practiced without a default level. In this case, a level must be selected at the beginning of processing each scan line, and the selection of the new level must be communicated to the decoder.

Following step 210, a quantizer is selected at step 214. The quantizer is selected based on the difference calculated between the sample value of the $0^{th}$ picture element of line 1 and the sample value of the $0^{th}$ picture element from the $0^{th}$ scan line at step 210. The quantizer is selected from the default quantization table level. Following quantizer selection, information identifying the selected quantizer is placed into the information stream at step 216.

Once the sample value of the $0^{th}$ picture element has been encoded, that is, after the difference has been calculated and after the quantizer has been selected, the quantizer is decoded and written back to a buffer for use as a predictor by the $0^{th}$ element of the next scan line. The decoding occurs at step 218. The decoding step 218 uses the quantizer to look up a quantization value in the currently selected quantization table level. The quantization value is placed in a buffer or other storage device at step 220.

After processing the $0^{th}$ picture element of line 1 in steps 208, 210, 214, 216, 218, and 220, the next picture element in the current scan line (presently line 1) is processed. The next picture element is sampled at step 222, and a difference between the sample value of the current picture element and the sample value for the corresponding picture element from the previous scan line is calculated at step 224.

At step 226, a quantization table level is selected. The selection is based on the difference calculated at step 224. Specific example embodiments of level selection algorithms are discussed below in connection with FIG. 4.

Following quantization table level selection at step 226, a determination is made at step 228 on whether a level switch should occur. The term "level switch" as used herein means that a different quantization table level will be used for the current quantizer selection than was used for the previous quantizer selection. The invention may be practiced by allowing level switches every time a level is selected at step 226, or the invention may be practice by restricting the frequency of level switches. For example, it is possible to only allow level switches every four times a picture element is processed. Thus, a single level is used for at least four contiguous samples before a level switch can occur. Restricting the frequency of level switches has the benefits of reducing traffic on the information stream, helping to providing an adequate compression ratio, and allowing easier and speedier decoding. Further, it is possible to limit the total number of times a level shift can occur for an entire frame. The Y, $C_R$ and $C_B$ planes can be considered separately or in combination when determining a level shift maximum. As an example, the maximum number of level shifts can be set to equal 10% of the byte size of one raw (uncompressed) video frame, plus one. The plus one is there in order to handle the case where the 10% limit is reached part way through a scan line. The one extra level switch can be used to switch to the default level, and the default level will then be used for the remainder of the frame. Level shift maximums other than 10% are also possible. Further, the level shift maximum may be varied at any time.

If a determination is made at step 228 that a level switch is required, information identifying the new level is placed into the information stream at step 230. Step 230 may include placing an escape code into the information stream to let the decoding device know that information identifying a new level follows. Following step 230 is step 232.

If no level switch is required or allowed, control passes to step 232 following step 228. At step 232, a quantizer is selected from the proper quantization table level and information identifying the selected quantizer is placed into the information stream. Following step 232, the current sample is decoded at step 234 and the decoded current sample is placed in a buffer or other storage device at step 236.

If previous steps 222 through 236 processed the last picture element in the current scan line, then control passes to step 240. Otherwise, step 222 follows step 238 and another picture element is processed at steps 222 through 236. These steps are repeated until the final picture element for the current scan line has been processed.

At step 240, a determination is made on whether the current scan line is the last scan line in the frame. If the current scan line is the last scan line, then the processing of the frame (or at least one plane of the frame) has completed. Otherwise, the processing of the next scan line begins at step 208. Steps 208 through 240 are repeated until the last scan line has been processed.

FIGS. 3 through 6b set forth a couple of examples of how the invention may be practiced. FIG. 3 shows an example Y-plane 300 consisting of two scan lines and eight sampled picture elements per scan line. The Y-plane 300 is not intended to represent a realistic sampled Y-plane, but is disclosed in order to provide a simple example. The Y-plane 300 is discussed below in connection with FIGS. 5a through 6b'.

FIG. 4 depicts an example quantization table 400 implemented in accordance with one embodiment of the invention. The table 400 consists of 5 levels with levels 0 through 2 including 15 quantizers each and levels 3 and 4 including 7 quantizers each. One embodiment of the invention has two modes of operation: 1) a high quality, 4-bit encoding mode; and 2) a high compression, 3-bit encoding mode. For table 400, the quantizers delineated by the dashed line are used for the high quality mode, while the quantizers delineated by the solid line are used for the high compression mode. The quantization values included in the table 400 are examples. It is possible to practice the invention using different numbers of levels, embodying different numbers of quantizers and using different quantizer values.

The invention may also be practiced with more than one quantization table. It is possible to switch between two or more quantization tables as applications require. For example, one table could be used to provide standard encoding while another is used to provide under correction. Under correction has the effect of both smoothing out quantization noise (the decoded and displayed images look subtly blurred, but this tends to look "better"), and reducing the number of level shifts. One method of applying under correction involves multiplying the differences calculated in steps 210 and 224 in FIG. 2 by a factor of, for example, between 0.5 and 1. Another method of applying under correction is to scale the quantization table values by a factor of, for example, between 1 and 2. A factor of 1 in each method if applying under correction is the same as having no under correction. Thus, one table could be used to provide no under correction while another table could be used to provide under correction. Multiple tables could be used to provide varying degrees of under correction. Further, while one table is being used for encoding, another table may be updated or its values changed.

One embodiment of the invention also provides a separate decode table. This allows an under correction factor to be applied to the encode table(s) only. Alternatively, the decode table could include the same quantization values as the encode table(s).

FIG. 5a illustrates a high quality, 4-bit encoding example implemented in accordance with one embodiment of the invention. This example uses the example Y-plane 300 shown in FIG. 3 and the quantization table 400 shown in FIG. 4. First, the difference between the $0^{th}$ sample of the current line and the $0^{th}$ sample of the previous line is calculated. The difference has a value of −1. Next, a "best" level is selected. The method for selecting the "best" level for this example embodiment is as follows:

For all Y-plane data
  if (absolute value of the calculated difference)<65
    best level=1; (default level at the beginning of each scan line) else
    best level=2;
For all $C_R$ and $C_B$ plane data
  if (absolute value of calculated difference)<8
    best level=0; (default level at the beginning of each scan line) else
    best level=1.

Note that level 0 is not used when encoding the Y-plane and level 2 is not used when encoding the $C_R$ and $C_B$ planes. Also, the present embodiment implements a policy of restricting level shifts to once every four samples. One possibility, implemented in the present embodiment, is to determine the "best" level for four contiguous samples, then use the highest level for all four samples. As mentioned above, the default level for the beginning of each scan line for the Y-plane is level 1. Thus, the first four samples in the present example use level 1.

Once the "best" level is determined, the difference (−1 in the case of sample 0) is matched to the closest quantization table 400 value. The closest quantization table 400 value for in level 1 for sample 0 is 0. Quantization value 0 corresponds to quantizer 0, thus 0 is output into the information stream. Samples 1 through 3 are likewise processed, with level 1 used in each case.

For sample 4, the difference between the 4$^{th}$ sample of the previous scan line and the 4$^{th}$ sample of the current line is −119. Using the "best" level algorithm disclosed above, the "best" level for the 4$^{th}$ sample is 2. Note that the highest "best" level for sample 4 through 7 is level 2. Thus, level 2 will be used for samples 4 through 7. In the present example, an escape code of 15 is placed in the information stream to signal to the decoding device that a new level follows. Thus, a value of 15 followed by a value of 2 are placed into the information stream. The difference of −119 for the 4$^{th}$ sample matches most closely in level 2 with the quantization value −129 which corresponds with quantizer 12. Therefore, a value of 12 is placed into the information stream. Samples 5 through 7 are processed in similar fashion, each using level 2.

FIG. 5b depicts an example decoding result from the high quality, 4-bit encoding example illustrated in FIG. 5a implemented in accordance with one embodiment of the invention. The values in FIG. 5b are the result of decoding the information placed into the information stream in the example shown in FIG. 5a. The decoding table used to determine the values in FIG. 5b includes the same quantization table values as the table 400 in FIG. 4.

FIG. 6a illustrates a high compression, 3-bit encoding example implemented in accordance with one embodiment of the invention. This example also uses the example Y-plane 300 shown in FIG. 3 and the quantization table 400 shown in FIG. 4. First, the difference between the 0$^{th}$ sample of the current line and the 0$^{th}$ sample of the previous line is calculated. The difference has a value of −1. Next, a "best" level is selected. The method for selecting the "best" level for this example embodiment is as follows:

For all Y-plane data
  if (absolute value of the calculated difference)<33
    best level=2; (default level at the beginning of each scan line)
  else if (absolute value of the calculated difference)<65
    best level=3; else
    best level=4;
For all $C_R$ and $C_B$ plane data
  if (absolute value of calculated difference)<11
    best level=0; (default level at the beginning of each scan line)
  else if (absolute value of calculated difference)<21
    best level=1; else
    best level=2.

Note that levels 0 and 1 are not used when encoding the Y-plane and levels 3 and 4 are not used when encoding the $C_B$ and $C_R$ planes. This example also implements the policy of restricting level shifts to once every four samples, and in particular, the policy of using the highest "best" level for four contiguous samples. As mentioned above, the default level for the beginning of each scan line for the Y-plane is level 2. Thus, the first four samples in the present example use level 2.

Once the "best" level is determined, the difference (−1 in the case of sample 0) is matched to the closest quantization table 400 value. The closest quantization table 400 value for in level 2 for sample 0 is 0. Quantization value 0 corresponds to quantizer 0, thus 0 is output into the information stream. Samples 1 through 3 are likewise processed, with level 2 used in each case.

For sample 4, the difference between the 4$^{th}$ sample of the previous scan line and the 4$^{th}$ sample of the current line is −119. Using the "best" level algorithm disclosed above, the "best" level for the 4$^{th}$ sample is 4. Note that the highest "best" level for sample 4 through 7 is level 4. Thus, level 4 will be used for samples 4 through 7. In the present example, an escape code of 7 is placed in the information stream to signal to the decoding device that a new level follows. Thus, a value 7 followed by a value 4 are placed into the information stream. The difference of −119 for the 4$^{th}$ sample matches most closely in level 4 with the quantization value −128 which corresponds with quantizer 6. Therefore, a value 6 is placed into the information stream. Samples 5 through 7 are processed in similar fashion, each using level 4.

FIG. 6b depicts an example decoding result from the high compression, 3-bit encoding example illustrated in FIG. 6a implemented in accordance with one embodiment of the invention. The values in FIG. 6b are the result of decoding the information placed into the information stream in the example shown in FIG. 6a. The decoding table used to determine the values in FIG. 6b includes the same quantization table values as the table 400 in FIG. 4.

Figure 7:
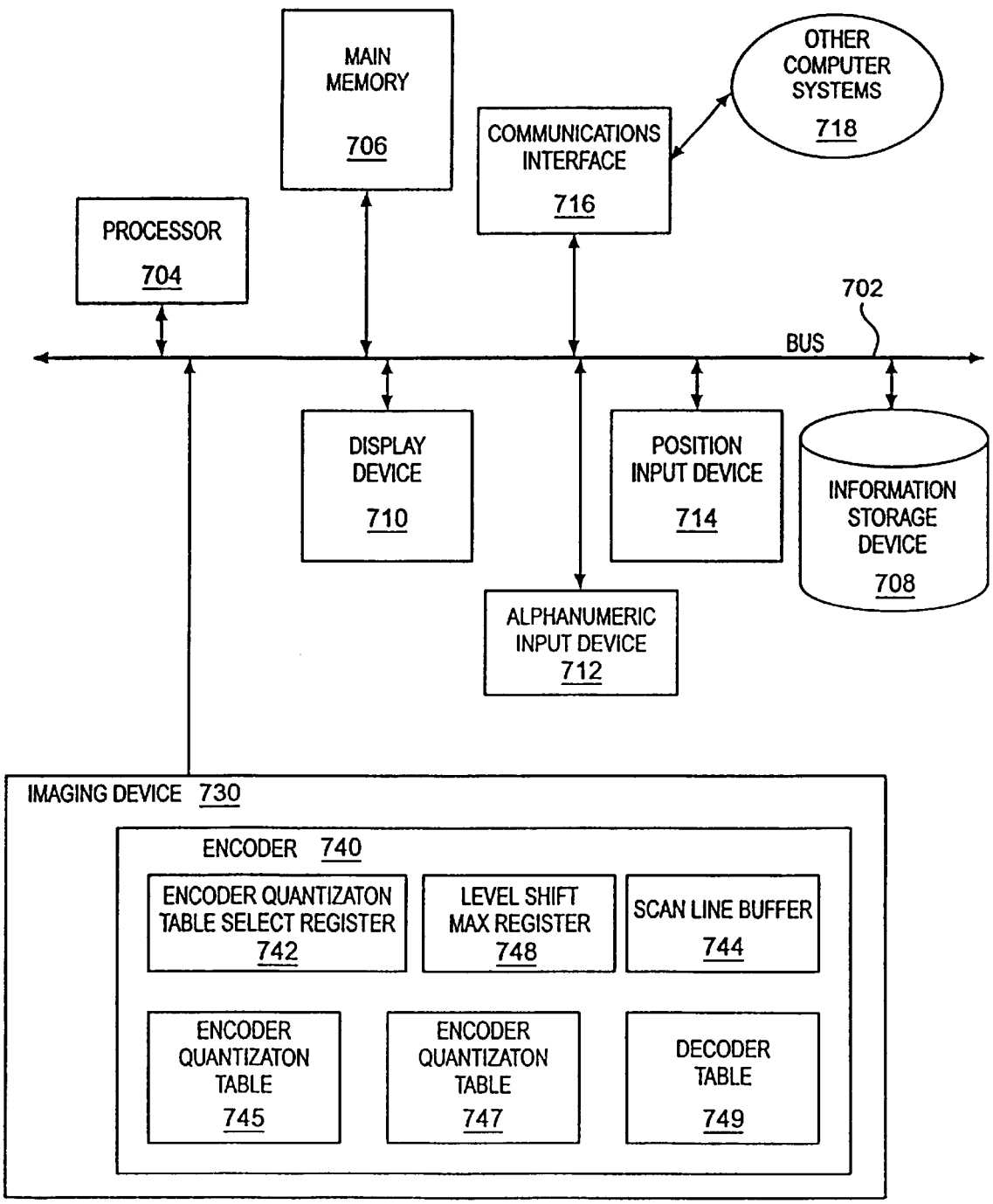
FIG. 7 shows an example computer system including an imaging device implemented in accordance with one embodiment of the invention.

FIG. 7 depicts an exemplary computer system 700 including an imaging device 730 having an encoder 740 implemented in accordance with one embodiment of the invention. Computer system 700 typically includes a bus 702 for communicating information, such as instructions and data. The system further includes a processor 704, coupled to the bus 702, for processing information according to programmed instructions, a main memory 706 coupled to the bus 702 for storing information for processor 704, and an information storage device 708 coupled with the bus 702 for storing information. In the case of a desk-top design for computer system 700, the above components are typically located within a chassis (not shown).

The processor 704 could be an 80960, 80386, 80486, Pentium^ processor, Pentium^ processor with MMX™ technology, Pentium^ Pro processor or Pentium^ II processor made by Intel Corp., among others, including processors that are compatible with those listed above. The processor 704 typically includes a plurality of pipelines for parallel and overlapping execution of operations. The main memory 706 could be a random access memory (RAM) to store dynamic information for processor 704, a read-only memory (ROM) to store static information and instructions for processor 704, or a combination of both types of memory. The processor 704 executes instructions that cause the output of the imaging device 730 to be decoded. The processor may either perform calculations in order to decode the output of the imaging device 730 or may use a decode table stored in the main memory 706. The results of the decoding may be displayed on a display device 710 or stored for later display in the information storage device 708 or in the main memory 706.

In alternative designs for the computer system 700, the information storage device 708 could be any medium for storage of computer readable information. Suitable candidates include a read-only memory (ROM), a hard disk drive, a disk drive with removable media (e.g., a floppy magnetic disk or an optical disk), or a tape drive with removable media (e.g., magnetic tape), synchronous DRAM or a flash memory (i.e., a disk-like storage device implemented with flash semiconductor memory). A combination of these, or other devices that support reading or writing computer readable media, could be used.

The input/output devices of the computer system 700 typically comprise the display device 710, an alphanumeric input device 712, a position input device 714, a communications interface 716, and the imaging device 730, each of which is coupled to the bus 702. The imaging device may comprise a digital camera. If the data storage device 708 supports removable media, such as a floppy disk, it may also be considered an input/output device.

The imaging device 730 includes the encoder 740 which comprises an encoder quantization table select register 742, a level shift maximum register 748, a scan line buffer 744, encoder quantization tables 745 and 747, and a decoder table 749. The table select register 742 is written to by the processor 704 or other system device in order to select which quantization table is to be used for encoding. The tables 745 and 747 may also be written to by the processor or other system device in order to update the values contained in the tables. Although two encoding tables are shown, any number of encoding tables may be used with the invention. The level shift maximum register 748 is used to store a value that determines the maximum number of level shifts allowed per frame. This register is may also be written to by the processor 704 or other system device. The scan line buffer 744 is used to store at least one previously sampled decoded scan line which is to be used as a predictor for a subsequent scan line. The decoder table 749 is used when decoding scan lines for storage in the line buffer 744. Example tables that may be used to implement tables 745, 747, and 749 are shown in FIGS. 8a, 8b, and 8c.

It will be clear to one skilled in the art that the invention can operate upon a wide range of programmable computer systems, not just the example computer system 700.

FIG. 8a depicts an example 4-bit encode table with no under-correction. This example table may be used to implement encoder quantization tables 745 and/or 747 shown in FIG. 7. The table shown in FIG. 8a uses only absolute values of the calculated difference to be encoded. This example table contains similar information as the table shown in FIG. 4 for 4-bit encoding, but since only absolute values are used, the table is smaller and therefore more efficient to implement in hardware. The absolute difference value must be less than the value in the quantizer (limit) column, with the exception of the "Last" column. The "Last" column contains the upper limits (Max) for the Y, $C_R$ and $C_B$ planes. Since the "Last" column contains these upper limits, no "less than" test occurs. When an upper limit is reached, the quantizer from the "Last" column is selected. For all of the columns, if the sign of the calculated difference to be encoded is positive, then the appropriate odd numbered quantizer is selected. If the sign of the calculated difference to be encoded is negative, then the appropriate even numbered quantizer is selected.

FIG. 8b shows an example 4-bit encode table that functions in a manner similar to the table depicted in FIG. 8a. The table of FIG. 8b, however, has 50% under correction applied. Notice that the table values are twice the values contained in the table of FIG. 8a. This example table may also be used to implement encoder quantization tables 745 and/or 747 shown in FIG. 7. Further, the table of FIG. 8a may be used to implement one of the tables 745 and 747 while the table of FIG. 8b may be used to implement the other.

FIG. 8c depicts an example 4-bit decode table that may be used in connection with the tables shown in FIGS. 8a and 8b. The present example decode table may be used to implement the decoder table 749 as shown in FIG. 7. The decode table of FIG. 8c also uses absolute values. If the quantizer to be decoded is an even number, then the sign of the decoded value will be negative. If the quantizer to be decoded is an odd number, then the sign of the decoded value will be positive. If the quantizer to be decoded is zero, then the decoded value will be zero.

Although the tables discussed above in connection with FIGS. 8a, 8b, and 8c are shown as having particular values, formats, and sizes, the tables may be implemented with varying numbers of levels and quantizers, and may also be implemented with different values. In particular, the tables of FIGS. 8a, 8b, and 8c may be implemented as 3-bit encode or decode tables, and also may implement varying amounts of under-correction.

In the foregoing specification the invention has been described with reference to specific exemplary embodiments thereof. It will, however, be evident that various modifications and changes me be made thereto without departing from the broader spirit and scope of the invention as set forth in the appended claims. The specification and drawings are accordingly to the regarded in an illustrative rather than in a restrictive sense.

What is claimed is:

1. An imaging device, comprising:

a quantization table to provide a quantization table level that is selected based on a calculated intra-frame difference between a first sample associated with a first element of a current scan line and a second sample associated with a second element of a previous scan line, the second element located immediately above the first element in a frame, wherein the frame comprises a plurality of scan lines and the current scan line and the previous scan line represent a portion of the plurality of scan lines;

the selected quantization table level to provide a plurality of quantizers that are selected according to the calculated intra-frame difference between a plurality of first samples and their corresponding second samples from a plurality of second samples;

an encoded bit stream to represent image data, the encoded bit stream including an encoded representation of the selected quantization table level and encoded information representing one or more of the plurality of quantizers; and a decoder quantization table including a plurality of quantization table levels.

2. The imaging device of claim 1 wherein each level of the plurality of quantization table levels comprises a plurality of values.

3. The imaging device of claim 1, wherein the plurality of quantizers includes a pre-defined number of the plurality of quantizers.

4. A method, comprising:

selecting a quantization table level based on a calculated intra-frame difference between a first sample associated with a first element of a current scan line and a second sample associated with a second element of a previous scan line, the second element located immediately above the first element in a frame, wherein the frame comprises a plurality of scan lines and the current scan line and the previous scan line represent a portion of the plurality of scan lines;

selecting a plurality of quantizers from the selected quantization table level, the plurality of quantizers selected according to the calculated intra-frame difference between a plurality of first samples and their corresponding second samples from a plurality of second samples; and generating an encoded bit stream representing image data, the encoded bit stream including an encoded representation of the selected quantization table level and encoded information representing one or more of the plurality of quantizers; the encoded bit stream comprises a pre-defined number of quantizers between the quantization table levels.

5. The method of claim 4, further comprising selecting an encoder quantization table.

6. A imaging device system, comprising:

a processor coupled to a bus;

a storage device coupled to the bus; and an imaging device coupled to the bus, the imaging device having a quantization table to provide a quantization table level that is selected based on a calculated intra-frame difference between a first sample associated with a first element of a current scan line and a second sample associated with a second element of a previous scan line, the second element located immediately above the first element in a frame, wherein the frame comprises a plurality of scan lines and the current scan line and the previous scan line represent a portion of the plurality of scan lines, the selected quantization table level to provide a plurality of quantizers that are selected according to the calculated intra-frame difference between a plurality of first samples and their corresponding second samples from a plurality of second samples, an encoded bit stream to represent image data, the encoded bit stream including an encoded representation of the selected quantization table level and encoded information representing one or more of the plurality of quantizers, and a decoder quantization table including a plurality of quantization table levels.

7. The imaging device of claim 6, wherein each level of the plurality of quantization table levels comprises a plurality of values.

8. The imaging device of claim 6 wherein the plurality of quantizers includes a pre-defined number of the plurality of quantizers.

* * * * *

UNITED STATES PATENT AND TRADEMARK OFFICE
CERTIFICATE OF CORRECTION

PATENT NO. : 6,771,830 B2
DATED : August 3, 2004
INVENTOR(S) : Goldstein et al.

Page 1 of 1

It is certified that error appears in the above-identified patent and that said Letters Patent is hereby corrected as shown below:

Column 2,
Line 65, delete "encode" and insert -- decode --.

Column 10,
Line 22, delete "me" and insert -- may --.
Line 25, delete "the" and insert -- be --.

Signed and Sealed this

Thirtieth Day of November, 2004

JON W. DUDAS
*Director of the United States Patent and Trademark Office*